3,475,785
METHOD FOR KILLING POULTRY
William C. Woods, Forest, Miss., assignor, by mesne assignments, to Gordon Johnson Company, Kansas City, Mo., a corporation of Missouri
Filed July 21, 1967, Ser. No. 654,988
Int. Cl. A22b 3/08; A22c 21/00
U.S. Cl. 17—52   13 Claims

ABSTRACT OF THE DISCLOSURE

This application discloses a method of killing poultry consisting essentially of cutting the neck with a thin, high-pressure jet of water or other fluid. This method is simple, economical, and permits high-speed killing of birds suspended from moving conveyor lines moving said birds to scalding tanks preparatory to feather removal and other process steps, and has the general advantages of providing complete severance of the jugular and other major blood vessels of the neck, thereby providing rapid thorough bleeding and a more uniform "dying time," while at the same time avoiding severance of the trachea or "windpipe," and cutting or knicking of the spinal column, both of which occurrences have various undesirable results.

---

Figure 1:
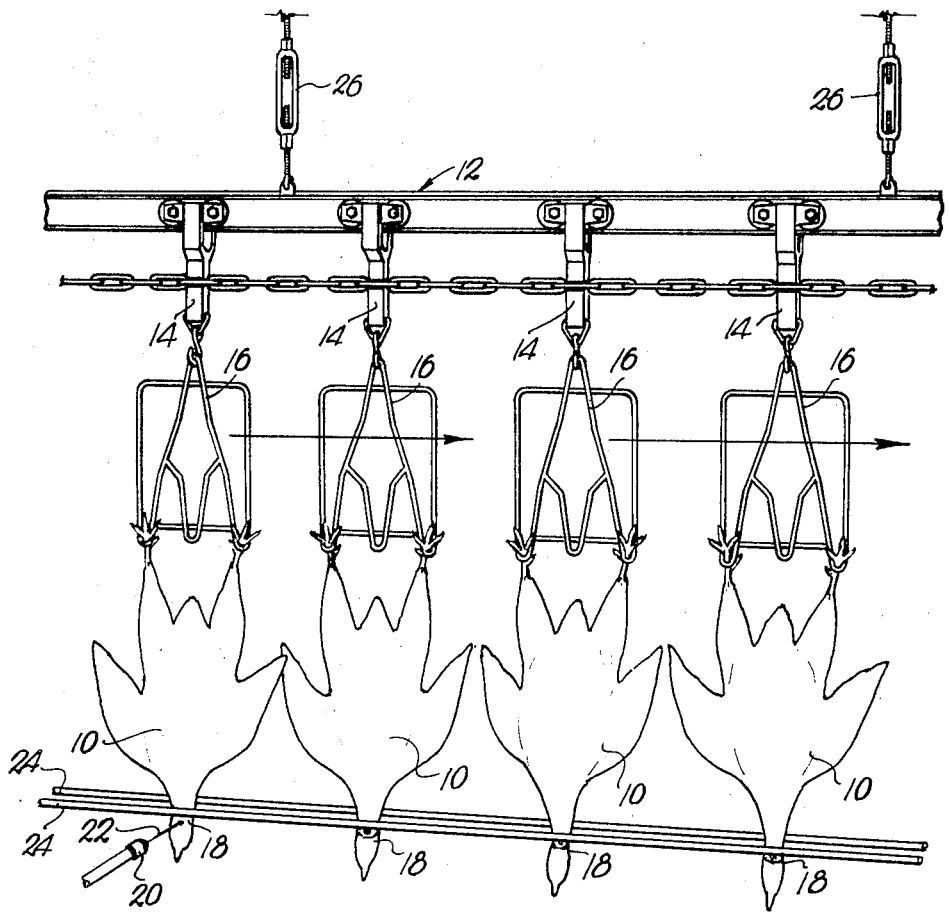

This application relates to new and useful improvements in methods for killing poultry or other meat animals.

In commercial poultry processing plants, the birds are almost universally killed by human operators using knives to slit the throats, the birds first being suspended by their feet from shackles on travelling conveyors, and then killed as they are moved by the conveyor toward a scalding tank. They then bleed to death, preferably just before they reach the scalding tank.

Certain difficulties arise in this procedure due to the necessity of making a careful, accurate cut of the throat, coupled with the fact that in modern high-speed plants each human operator may be required to kill as many as 1500 birds per hour, so that he has only 2 or 3 seconds to devote to each bird. Under these circumstances, it is manifest that a careful, accurate cut will not always be performed and it is from this lack of care and accuracy that difficulties often arise.

Firstly, it is important that the jugular vein of each bird be severed completely, in order that the time subsequently required for complete bleeding and death to occur can be maintained as uniform as possible, to the end that the birds can be killed at such a time interval before they reach the scalder that each bird will be completely bled and dead before it reaches the scalder, but will not have been dead too long. Incomplete severance of the jugular vein, with resulting variations in the "dying time" as described, creates definite problems resulting in financial losses. If the severance is incomplete and the dying time thereby lengthened, the bird may not be completely bled when it reaches the scalder, and not yet dead. If this occurs, remaining blood will rush to the surface in repsonse to the heat of the scalder, causing a surface lividity. Such carcasses are classified as "misbled" by inspectors, and are commonly referred to as "cadavers." They must be discarded, or at least downgraded radically, either event of course representing financial loss. Another common occurrence of a bird is not actually dead when it reaches the scalder is that it actually may then die by drowning, inhaling the bacteria-laden water of the scalder into its lungs, and filling the air sacs of the carcass. This contaminated water may then be scattered through the carcass during the later process step of eviscerating the bird, with resultant contamination of other parts of said carcass. To an inspector, the presence of water in the air sacs is an indication either that the bird actually did die by drowning as described, or of the presence of a disease known as "air saculitis," both requiring disposal of the affected carcass and representing financial loss. Still another reason that bleeding and death should be complete before the bird reaches the scalder is the fact that immediately following death, it is believed within a second or two of the last breath, a relaxation of the anal sphincter muscle occurs, and the bird relieves the contents of the colon. This simplifies the problems of later performing efficient and sanitary evisceration, and is therefore desirable. However, if the bird is not actually as yet dead when it reaches the scalder, this action will occur in the scalding bath, where it complicates the cleaning process and increases the chances of contamination.

As a result of the above problems resulting from incomplete severance of the jugular vein and resultant variations in the dying time, it is sometimes the practice to cut the throat at a sufficiently great time interval before the bird reaches the scalder to insure that it will be completely bled and dead before it arrives at the scalder, despite the possible incomplete severance of the jugular veins of some of the birds. However, this practice also creates certain problems, principally that it tends to defeat the prime purpose of the scalding, which is to loosen the feathers for subsequent removal, usually by automatic picking machines. The heat of the scalding bath acts on the nervous system of the bird (still responsive to this stimulus if the bird has not been too long dead) to relax the feather follicles of the skin to permit easier removal of the feathers. If the time allowed between cutting of the throat and immersion in the scalding bath is increased to insure complete bleeding and death of any bird the jugular vein of which has not been completely severed, it is inevitable that the birds whose jugular veins actually are completely severed will have been dead for some time before they reach the scalder. The nervous systems of these birds are far less active, and do not respond as well to the heat stimulate of the scalding bath to relax the feather follicles. These birds are then difficult to defeather, being known as "hard pickers," and often require additional equipment or hand labor to pick cleanly. This of course represents a substantial financial cost.

Other possible occurrences resulting from inaccurate use of a killing knife are that said knife may cut or sever the trachea or "windpipe," or that it may knick or cut the vertebrae or spinal column. If the trachea is cut, a most violent death occurs, causing the bird to struggle strenuously and convulsively, resulting in possible bruising, wing breakage or other damage either to itself or to the other nearby birds. This also of course requires downgrading of such a bird due to the damage, and represents a considerable loss. If the vertebrae or spinal column are nicked or cut, it results in a most severe shock to the central nervous system of the bird, which while not resulting in the violent convulsions of a cut trachea, causes a rigid tightening or spasm of virtually all of the muscles. This spastic condition tends not to be completely alleviated even by subsequent death and scalding, with the result that the bird also becomes a "hard picker."

Accordingly, the principal object of the present invention is the provision of a method for killing poultry and the like which largely overcomes all of the above enumerated problems, in that it may readily be performed by automatic equipment rather than by human operators, which will insure complete severance of the jugular vein to produce a more uniform dying time than is possible with human operators, with the advantages resulting from said uniform dying time, and which at the same time will eliminate any possibility of cutting or severing the trachea, vertebrae or spinal column.

Generally, this sobject is accomplished by moving the throat of the bird in intersecting relationship with a high speed, high-pressure jet of water or other fluid, either liquid or gaseous, whereby the throat is cut. By proper selection of the pressure and velocity of the jet, and this selection has not been found to be critical, a condition may be reached wherein the jet will positively sever softer tissues such as feathers, skin, flesh, fat, blood vessels and the like, but will not cut harder tissues such as the trachea or windpipe, vertebrae, tendons and the like.

Figure 2:
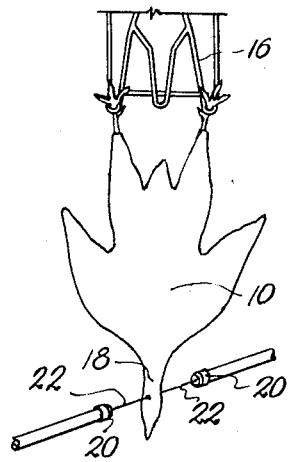

In the drawing:

FIGURE 1 is a fragmentary perspective view of one form of apparatus adapted for carrying out the method of my present invention showing the poultry suspended by their feet; and FIG. 2 is a fragmentary perspective view of a suspended bird illustrating the use of my method when a plurality of high pressure jets are used.

In carrying out the killing method contemplated by the present invention, birds 10 are first suspended by their feet to hang head down, so that they will bleed properly after their throats have been cut. This step is already commonly performed, since the head-down position of the bird 10 is of course, also necessary if it is killed by the usual knife method. Ordinarily, each bird 10 is removed from its shipping cage by a workman and suspended by its feet from an overhead conveyor 12 having a carriage 14 which supports a suitable shackle 16 for transporting the bird 10 through various process steps including, in sequence, killing, scalding, picking and evisceration, usually finally depositing it in a chilling bath for washing and removing body heat therefrom. The killing is the first operation performed after suspension from the conveyor shackle 16, and it is performed at a point sufficiently far ahead of the scalding operation that, ideally, the bird 10 will be completely bled, and dead, just before it reaches the scalder, for the reasons discussed above in detail. However, with manual killing it often occurs that the bird 10 is either not dead, or has been too long dead, when it reaches the scalder, with the undesirable results also discussed above.

The jet killing method contemplated by the present invention may be performed by various mechanical arrangements forming no essential part of the present invention but offering no great structural problems. While severing of the juglar vein in the neck 18 is perhaps the most practical location to make the cut, it is also possible to sever major blood vessels in other parts of the carcass, that portion of the carcass then being disposed downwardly to insure proper and complete bleeding. Nevertheless, the common foot or leg suspension of birds makes the neck cut to sever the jugular vein the most practical application of the method by present standards, the bird then hanging upside down to insure thorough bleeding of the entire carcass.

A fluid jet nozzle 20 may be fixedly mounted adjacent the path of travel of the birds 10 indicated by the arrows in FIG. 1, and positioned to direct a fluid jet 22 generally horizontally through said path, so that the neck 18 of each bird 10 moves in intersecting relations to the jet 22. Of course, insofar as the basic concept of the invention is concerned, it is necessary only that the neck 18 and jet 22 move relatively in intersecting relationship, so that either the bird 10 or the nozzle 20 could be the moving element, but stationary nozzles 20 take advantage of the movement of the birds 10 themselves already provided by the common usage of conveyors 12.

Guides such as in the form of a pair of rails 24 may be mounted adjacent the path of poultry travel to engage and guide the necks 18 to insure movement thereof in proper relation to the nozzle 20, and to prevent the necks 18 from being pushed or swung by the force of the jet 22. The rails 24 are disposed at opposite sides of the path of travel, spaced apart sufficiently to allow passage of the necks 18 therebetween, and the nozzle 20 positioned to direct jet 22 transversely to said rails 24. The nozzle 20 could in fact be mounted in the rails 24 themselves. Means for adjusting the elevation of the birds 10 in the form of turnbuckles 26 are provided so that regardless of the length of the bird 10 as suspended, the correct point of its neck 18 at which the cut should be made is disposed at the elevation of the nozzle 20. Generally, it is agreed that the throat should be cut at a point just behind the jawbone of the bird as illustrated in FIG. 1.

Obviously, one or a plurality of nozzles 20 could be used. One jet 22 will perform effectively if the bird's neck 18 is properly positioned with respect to the jet 22. However, with the neck 18 vertical and the jet 22 horizontal, it will be apparent that as the bird 10 turns about a vertical axis, which it is free to do with many types of swivelled conveyor shackles in common use, there will be certain rotative positions in which the jugular vein might be protected from the action of the jet 22 by the backbone vertebrae, tendons, trachea or other hard or bony tissue of the neck, so as not to be severed thereby. This problem could be solved either by using the non-swivelled shackle 16 (FIG. 1), where this is permissable, to fix the bird against rotation about its vertical axis, or by using a plurality of jets 22, with one or more nozzles 20 disposed at each side of the path of travel of the neck 18 as shown in FIG. 2. By this means, the juglar vein, as well as virtually all of the blood vessels of the neck 18, will be subjected to the cutting action of at least one of the jets 22, regardless of the rotative position of neck 18. Another general advantage of the subject method is that it provides for the severing not only of the jugular vein, but also of all, or nearly all of the blood vessels of the neck 18 which are normally not severed by the usual knife cutting method. This permits still more rapid and efficient bleeding and provides a still shorter and more uniform "dying time."

If water is used as the jet medium, and most of the experimentation performed to this date has used this medium, it has been found that a one-eighth inch diameter nozzle with a flow pressure of 1,000–2,000 p.s.i. performs quite effectively, in that it severs feathers, skin, fat, blood vessels and the like to provide rapid and efficient bleeding, but does not cut or sever the trachea, so that the bird continues to breathe normally until it does die and does not fight violently to injure itself or adjoining birds, and does not cut or knick the vertebrae or spinal column to cause spasms making the bird a "hard picker." However, these specific figures are exemplary only, and may vary with nozzle diameter and design, as well as with the nature of the fluid used. Other liquids than water could obviously be used if necessary or desirable, and preliminary experimentation indicates that gaseous fluids such as air can also be used, although of course requiring higher pressures and velocities.

What I claim as new and desire to protect by Letters Patent is:

1. A method of killing poultry or the like comprising moving a bird relatively in intersecting relation to a high velocity fluid jet capable of severing the skin, flesh and blood vessels of said bird, whereby to cause bleeding and death of said bird.

2. A method as recited in claim 1 wherein said bird is positioned with the portion thereof cut by said jet at the lower portion of the carcass, whereby said bleeding of said carcass is assisted by gravity.

3. A method as recited in claim 1 wherein said jet is provided by a high-speed stream of liquid.

4. A method as recited in claim 1 wherein said jet is provided by a high-speed stream of gas.

5. A method as recited in claim 1 wherein said bird is suspended in a head-down position, and wherein said jet traverses the neck of said bird.

6. A method as recited in claim 5 wherein said jet has sufficient force to sever the softer tissues of the bird including the skin, flesh and blood vessels thereof, but insufficient force to sever the harder tissues of the bird including the vertebrae and trachea thereof.

7. A method as recited in claim 6 wherein said jet consists of a stream of water of about 1/8 inch diameter under a flow pressure of about 1,000–2,000 pounds per square inch.

8. A method as recited in claim 1 wherein said bird is suspended in a head-down position and is conveyed along a generally horizontal path of travel, and wherein said jet is directed generally horizontally to intersect said path of travel at the elevation of the neck of said bird.

9. A method as recited in claim 8 wherein said jet is of sufficient force to sever the softer tissues of the bird including the skin, flesh and blood vessels thereof, but of insufficient force to sever the harder tissues of the bird including the vertebrae and trachea thereof.

10. A method as recited in claim 8 with the additional step of guiding the neck of said bird to prevent movement thereof transversely to its path of travel, either by muscular action of the bird itself or by action of said jet.

11. A method as recited in claim 8 with the additional step of adjusting the elevation of the bird relative to its suspension whereby to present any given point of its neck, with regard to the vertical elevation of said point, to the action of said jet.

12. A method as recited in claim 8 with the additional step of guiding said bird to prevent rotation thereof about a vertical axis with respect to its suspension, whereby to present a given angular portion of its neck, relative to said vertical axis, to the action of said jet.

13. A method as recited in claim 8 utilizing a plurality of said fluid jets directed to intersect said path of travel from respectively opposite sides thereof.

References Cited

UNITED STATES PATENTS

| | | | |
|---|---|---|---|
| 2,210,377 | 8/1940 | Onorato et al. | 17—11 |
| 2,306,773 | 12/1942 | Biffinger | 17—11 |
| 2,412,338 | 12/1946 | Jasper | 17—45 |
| 2,523,302 | 9/1950 | Hunt | 17—45 |
| 3,243,839 | 4/1966 | Norwood | 17—11 |

LUCIE H. LAUDENSLAGER, Primary Examiner

U.S. Cl. X.R.

17—11, 51; 146—227